June 25, 1935. H. KETEL ET AL 2,005,722
FIFTH WHEEL CONSTRUCTION
Original Filed May 29, 1933
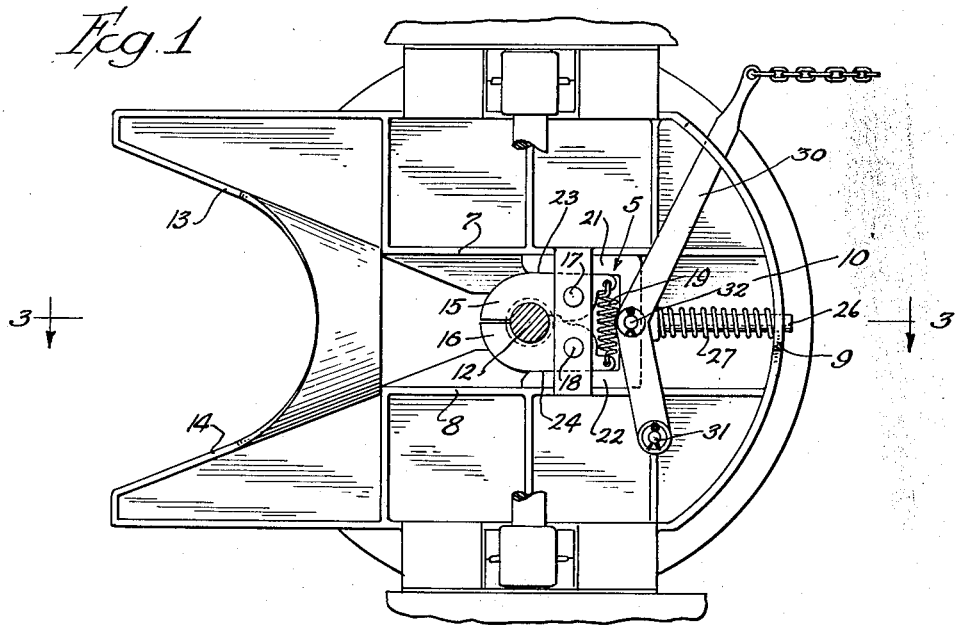
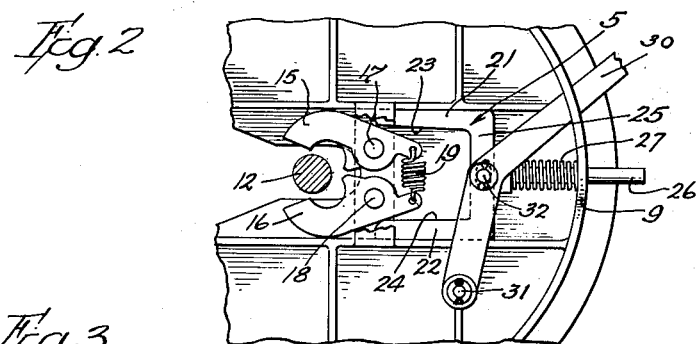
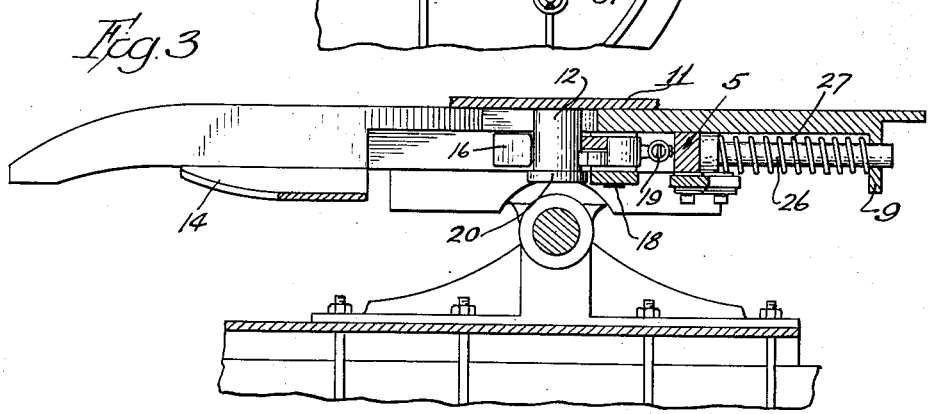
Inventor
Henry Ketel,
Charles M. Harris,
Hine Van der Heuvel
Charles B. Rasmussen
Atty.

Patented June 25, 1935

2,005,722

UNITED STATES PATENT OFFICE 2,005,722

FIFTH WHEEL CONSTRUCTION

Henry Ketel, Muskegon, and Charles M. Harris and Hine Van Der Heuvel, Holland, Mich., assignors, by mesne assignments, to West Michigan Steel Foundry Co., Muskegon, Mich., a corporation of Michigan Original application May 29, 1933, Serial No. 673,328. Divided and this application March 23, 1934, Serial No. 717,032

4 Claims. (Cl. 280—33.1)

This invention relates in general to coupling devices, and has more particular reference to fifth wheel units for coupling trucks or tractors to trailers and the like. This application is a division of an application filed May 29, 1933, bearing Serial No. 673,328.

A principal object of the invention is the provision in a fifth wheel unit of an automatic coupler for coupling two vehicles together.

An important object of the invention is the provision in a fifth wheel unit having an automatic coupler, of means for maintaining the locking mechanism in locked position until manually or otherwise released.

Numerous other objects and advantages of the invention will be apparent as it is better understood from the following description, which, when taken in connection with the accompanying drawing, illustrates a preferred embodiment thereof.

On the drawing,

Figure 1 is a bottom plan view of a fifth wheel construction, showing the parts in coupled or locked position;

Fig. 2 is an enlarged fragmentary section, similar to Fig. 1, showing the parts in unlocked position; and Fig. 3 is a section taken substantially on the line 3—3 of Fig. 1.

As shown on the drawing, the lower fifth wheel member, generally indicated at 10, is provided with a flat upper surface adapted to slidably engage an upper fifth wheel plate 11 to which is attached a king pin 12. The upper fifth wheel plate or bolster 11 is fastened to a suitable trailer (not shown). The king pin 12 is or may be formed integral with the upper plate 11 or may be suitably attached thereto.

The king pin 12 is provided with a shoulder 20 at its lower end for a purpose to be later described.

The lower fifth wheel member is provided with a pair of flaring cam surfaces 13 and 14, the purpose of which is to guide the king pin into the path of jaws 15 and 16 (Fig. 2). These jaws, which are identical in shape, are pivotally mounted, as at 17 and 18, to a cross support 6, this support forming a part of the lower fifth wheel member 10.

A relatively heavy spring 19 is interposed between the ends of the jaws 15 and 16 and normally urges the jaws to the open position shown in Fig. 2. In order to maintain the jaws in a closed or locked position, a locking yoke or member, generally indicated at 5, is provided. This yoke member comprises a pair of longitudinally extending arms 21 and 22 and a transversely extending bracket or cross-member 25 formed integrally therewith. The inner edges or sides of the arms 21 and 22 are tapered, as indicated at 23 and 24, respectively.

A guiding post or rod 26 is or may be fastened to the cross-member 25 and extends outwardly from the member 25 and has bearing at its forward end in a reinforcing rib 9 cast integrally with the lower fifth wheel member 10. A relatively light spring 27, encircling the post 26, is interposed between the rib 9 and the cross-member 25 and serves to normally urge the yoke into operative position as shown in Fig. 1.

A pair of longitudinally extending ribs 7 and 8, cast integrally with the under surface of the lower fifth wheel member 10, are spaced in parallelism and serve to guide the yoke member in its movement. The cross support 6 also serves to support the yoke member in position.

A manually operated lever 30 is pivoted at 31 to the under side of the lower cast wheel member 10 and has a pin and slot connection at 32 with the cross-member 25 of the yoke 5, whereby operation of the lever 30 withdraws the yoke from the jaw locking position shown in Fig. 1 to the jaw releasing position shown in Fig. 2.

The shoulder or enlarged portion 20 of the king pin 12 maintains the upper fifth wheel member against vertical displacement.

The operation of the device is as follows: The sliding yoke 5 is manually withdrawn to the inoperative position shown in Fig. 2 and against the tension of the spring 27. As the yoke moves to inoperative position the spring 19 moves the king-bolt encircling jaws 15 and 16 to open position until they rest against the ribs 7 and 8, which in addition to guiding the sliding yoke, limit the movement of the jaws 15, 16.

It will be seen from Fig. 2 that when the jaws are in full open position, the free ends of the arms 21 and 22 of the yoke member rests against the jaws and since the spring 19 which maintains the jaws in open position is stronger than spring 27 which urges the yoke member to operative position, movement of the yoke member is prevented until the jaws are moved to closed position and out of the path of travel of the arms 21 and 22 of the sliding yoke member.

As the truck or other vehicle is moved towards the trailer, the king pin enters the locking jaws and moves them to the closed position shown in Fig. 1 and out of the path of arms 21 and 22, whereupon the sliding yoke is urged to operative position by spring 27.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In combination, pivoted jaw members adapted to receive a king pin therebetween, extremely stout spring means for holding the jaw members in open position, a yoke engaging said jaw members on their outer faces and additional spring means tending to push the yoke member against the jaw members to move the same to jaw locking position, said additional spring means being of insufficient strength to overcome the resistance of said jaws and the first mentioned spring to closure movement.

2. In a lower fifth wheel member, the combination of pivoted jaw members, spring means for normally maintaining said jaw members in open position, ribs on the under side of said fifth wheel member, and a slidable yoke member adapted to engage said jaw members and said ribs to lock the jaws in closed position.

3. In a lower fifth wheel member, the combination of jaw members adapted to receive a king pin therebetween, spring means for holding the jaw members in open position, ribs depending from said fifth wheel member, a yoke adapted to engage said jaw members, and additional spring means tending to wedge said yoke between said ribs and said jaw members to close and lock said jaws in closed position.

4. In a lower fifth wheel member, the combatition of pivoted jaw members, means for normally maintaining said jaw members in open position, ribs on the under side of said fifth wheel member, and a slidable yoke member adapted to engage said jaw members and said ribs to lock the jaws in closed position.

HENRY KETEL.
CHARLES M. HARRIS.
HINE VAN DER HEUVEL.